US011770446B2

(12) United States Patent
Edmonds et al.

(10) Patent No.: US 11,770,446 B2
(45) Date of Patent: Sep. 26, 2023

(54) SYSTEMS AND METHODS FOR PROVIDING COMPLEMENTARY CONTENT ON LINKED MACHINES

(71) Applicant: eBay Inc., San Jose, CA (US)

(72) Inventors: Kent Andrew Edmonds, San Jose, CA (US); John Lago, San Francisco, CA (US); Niket Trivedi, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 595 days.

(21) Appl. No.: 14/471,953

(22) Filed: Aug. 28, 2014

(65) Prior Publication Data
US 2016/0063015 A1 Mar. 3, 2016

(51) Int. Cl.
H04L 67/1095 (2022.01)
H04L 67/02 (2022.01)
(Continued)

(52) U.S. Cl.
CPC ........ H04L 67/1095 (2013.01); G06F 16/957 (2019.01); G06Q 30/06 (2013.01); H04L 67/02 (2013.01); H04L 67/1074 (2013.01)

(58) Field of Classification Search
CPC . G06F 17/30899; G06F 16/957; G06Q 30/06; H04L 67/02; H04L 67/1095; H04L 67/1074
(Continued)

(56) References Cited

U.S. PATENT DOCUMENTS 8,225,191 B1 * 7/2012 Kalman ............ G06F 17/30873
707/620
9,575,615 B1 * 2/2017 Nicholls ................ G06F 3/048
(Continued)

FOREIGN PATENT DOCUMENTS

CN 107077454 A 8/2017
KR 10-2011-0090772 A 8/2011
(Continued)

OTHER PUBLICATIONS

"Application Serial No. PCT/US2015/047419, Invitation to Pay Additional Fees and Partial Search Report dated Oct. 26, 2015", 2 pgs.
(Continued)

Primary Examiner — Stephen S Hong
Assistant Examiner — Nicholas Hasty
(74) Attorney, Agent, or Firm — SHOOK, HARDY & BACON L.L.P.

(57) ABSTRACT

A system and method of displaying complementary content on one or more linked machines are disclosed. In some embodiments, the system and method may include a non-transitory, computer-readable medium storing computer-executable instructions and one or more processors in communication with the non-transitory, computer readable medium. When the computer-executable instructions are executed, the one or more processors may be configured to receive a linking instruction to link a display of second content of a website on a second machine to a selection of a portion of first content of the website by a first machine, cause a display of the first content on the first machine, receive the selection of the portion of the first content displayed on the first machine, and based on the portion of the first content being selected, cause the display of the
(Continued)

second content on the second machine based on the linking instruction.

20 Claims, 15 Drawing Sheets

(51) Int. Cl.
*G06Q 30/06* (2023.01)
*H04L 67/1074* (2022.01)
*G06F 16/957* (2019.01)

(58) Field of Classification Search
USPC .......................................................... 715/234
See application file for complete search history.

(56) References Cited

U.S. PATENT DOCUMENTS

| | | | |
|---|---|---|---|
| 2008/0282286 A1* | 11/2008 | Or | H04H 60/33 725/34 |
| 2009/0113298 A1 | 4/2009 | Jung et al. | |
| 2009/0164581 A1 | 6/2009 | Bove et al. | |
| 2010/0085857 A1 | 4/2010 | Herz et al. | |
| 2010/0235473 A1 | 9/2010 | Koren et al. | |
| 2010/0318426 A1 | 12/2010 | Grant et al. | |
| 2011/0191431 A1 | 8/2011 | Noguchi | |
| 2012/0174155 A1* | 7/2012 | Mowrey | H04N 5/44543 725/40 |
| 2012/0206497 A1 | 8/2012 | Sarjanoja | |
| 2013/0291123 A1 | 10/2013 | Rajkumar et al. | |
| 2013/0311664 A1 | 11/2013 | Pirnazar | |
| 2014/0032565 A1* | 1/2014 | Parker | G06F 16/438 707/E17.014 |
| 2014/0068432 A1* | 3/2014 | Kucharz | G06Q 10/107 715/716 |
| 2014/0108482 A1* | 4/2014 | Glasgow | G06F 21/305 709/201 |
| 2014/0237629 A1 | 8/2014 | Cork | |
| 2014/0282650 A1* | 9/2014 | Viles | H04N 21/23424 725/13 |
| 2014/0327677 A1* | 11/2014 | Walker | G06F 16/95 345/440 |

FOREIGN PATENT DOCUMENTS

| | | |
|---|---|---|
| KR | 10-2012-0034600 A | 4/2012 |
| WO | 2010/108157 A2 | 9/2010 |
| WO | WO-2016033454 A1 | 3/2016 |

OTHER PUBLICATIONS

"Introduction to WebRTC Architecture", [Online]. Retrieved from the Internet: <URL: https://developer.mozilla.org/en-US/docs/Web/Guide/API/We . . . >, (Accessed Jul. 29, 2014), 4 pgs.

Aboba, Bernard, et al., "Customizable, Ubiquitous Real-Time Communication over the Web", [Online]. Retrieved from the Internet: <URL: http://html5labs.interoperabilitybridges.com/cu-rtc-web/cu-rtc- . . . >, (Jul. 24, 2013), 21 pgs.

Hickson, Ian, "WebRTC 1.0: Real-time Communcation Between Browsers", © Copyright 2004-2011 Apple Computer, Inc., Mozilla Foundation, and Opera Software ASA., [Online]. Retrieved from the Internet: <URL: http://dev.w3.org/2011/webrtc/editor/webrtc.html>, (Jul. 1, 2014), 33 pgs.

"International Application Serial No. PCT/US2015/047419, International Search Report dated Jan. 11, 2016", 6 pgs.

"International Application Serial No. PCT/US2015/047419, Written Opinion dated Jan. 11, 2016", 13 pgs.

"European Application Serial No. 15834898.7 Response to Communication pursuant to Rules 161(2) and 162 EPC filed Jul. 19, 2017.", 22 pgs.

"International Application Serial No. PCT/US2015/047419, International Preliminary Report on Patentability dated Mar. 9, 2017", 8 pgs.

Partial Supplementary European Search Report received for European Patent Application No. 15834898.7, dated Dec. 15, 2017, 17 pages.

Extended European Search report received for European Patent Application No. 15834898.7, dated Mar. 5, 2018, 21 pages.

Final Office Action received for Korean Patent Application No. 10-2017-7008237, dated May 28, 2019, 6 pages (3 pages of English Translation and 3 pages of official copy).

Office Action received for Korean Patent Application No. 10-2017-7008237, dated Nov. 19, 2018, 14 pages (7 pages of English Translation and 7 pages of official copy).

Trial Board Decision received for Korean Patent Application No. 10-2017-7008237, dated Jul. 20, 2020, 40 pages (22 pages of English translation and 18 pages of official copy).

Communication Pursuant to Article 94(3) EPC received for European Patent Application No. 15834898.7, dated Jan. 28, 2019, 14 pages.

\* cited by examiner 120 and 122

| Publication Application 200 | Auction Application(s) 202 | Fixed-Price Application(s) 204 |
| Store Application(s) 206 | Reputation Application(s) 208 | Personalization Application(s) 210 |
| Internationalization Application(s) 212 | Navigation Application(s) 214 | Imaging Application(s) 216 |
| Listing Creation (Seller) Application(s) 218 | Listing Management (Seller) Application(s) 220 | Post-Listing Management Application(s) 222 |
| Dispute Resolution Application(s) 224 | Fraud Prevention Application(s) 226 | Messaging Application(s) 228 |
| Merchandizing Application(s) 230 | Loyalty Promotion Application(s) 232 | |

*FIG. 2*

SYSTEMS AND METHODS FOR PROVIDING COMPLEMENTARY CONTENT ON LINKED MACHINES

TECHNICAL FIELD

The present application relates generally to the technical field of data linking, and, in various embodiments, to systems and methods of providing complementary content on one or more secondary machines that have been linked to a primary machine.

BACKGROUND

A mobile device may be equipped with an Internet browser for viewing one or more web sites. While using the web browser on the mobile device, a user may visit one or more web pages belonging to an electronic marketplace. During the user's visit to the electronic marketplace, the user may request one or more web pages belonging to products and/or services offered by the electronic marketplace to be displayed on the mobile device's web browser. However, the display on a mobile device is limited in resolution and screen size when compared with other devices, such as a tablet computer, laptop computer, or desktop computer. Thus, it may be difficult for the user to view the web pages of the various products and/or services on the mobile device's display. Furthermore, should the user desire to do comparison shopping (e.g., view web pages for competing products and/or services in determining which product and/or service to purchase), the mobile device's display makes it difficult for the user to effectively view multiple web pages for different products and/or services.

BRIEF DESCRIPTION OF THE DRAWINGS

Some embodiments of the present disclosure are illustrated by way of example and not limitation in the figures of the accompanying drawings, in which like reference numbers indicate similar elements, and in which:

FIG. 2 illustrates applications, in accordance with an example embodiment, executable by one or more application servers.

DETAILED DESCRIPTION

Figure 1:
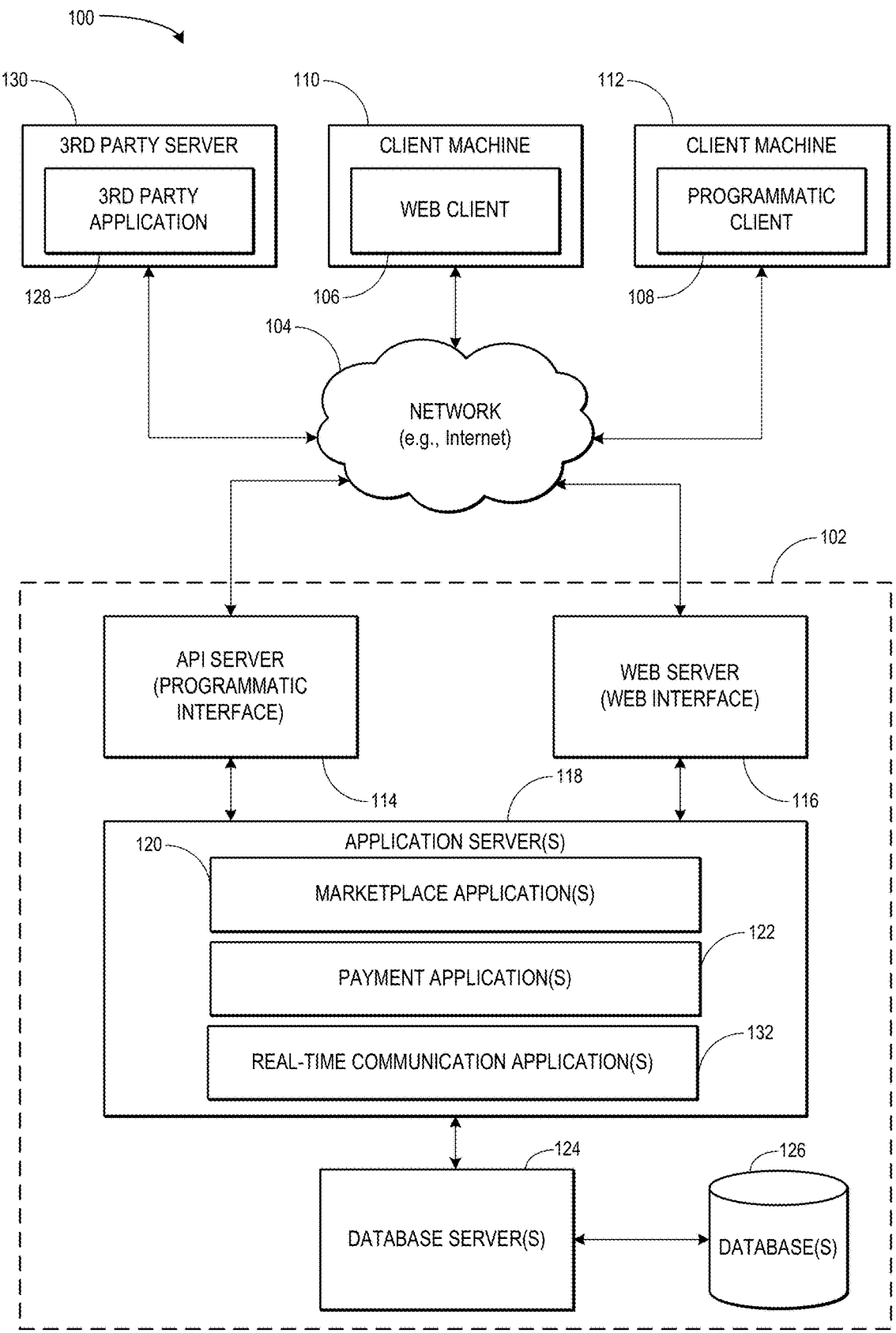
FIG. 1 illustrates a network architecture in accordance with an example embodiment.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure provides systems and methods for linking a primary client machine with a secondary client machine, and displaying content on both the primary client machine and the secondary client machine. The primary client machine may be configured to display primary content and the secondary client machine may be configured to display secondary content in response to a selection of primary content, or a portion thereof, displayed by the primary client machine. For example, the primary client machine may display a list of items matching a given search term or search criteria, and for each selection of an item from the displayed matching items, the secondary client machine may display a comparison table of the various features of the selected items. In this way, a user having client machines with limited display areas can maximize the amount of information presented to him or her when deciding which items to buy when these items are determined to be matching items for a given search term or search criteria.

In one embodiment, this disclosure provides a computer-implemented method that may include receiving, by one or more processors, a linking instruction to link a display of second content of a website on a second machine to a selection of a portion of first content of the website by a first machine, the second content being complementary to the first content and displaying, by a display in communication with the one or more processors, the first content on the first machine. The method may also include receiving the selection of the portion of the first content displayed on the first machine, and based on the portion of the first content being selected, causing the display of the second content on the second machine based on the linking instruction.

In another embodiment of the disclosed method, the first machine is associated with a user identifier having been provided during a first session of use of the website, the user identifier uniquely identifying a user of the website, the second machine associated with the user identifier having been provided during a second session of use of the website, and the method may further include receiving a request for the linking instruction based on the second session overlapping in time with the first session.

In a further embodiment of the disclosed method, the method may include causing a display of a linking identifier that identifies the first machine, wherein the linking instruction is received in response to a confirmation that the linking identifier is correctly displayed.

In an additional embodiment of the disclosed method, the method may include causing a change in the displaying of the first content displayed by the first machine based on an input received by the second machine.

In yet another embodiment of the disclosed method, the method may include determining whether the first machine and the second machine are in communication via a local area network, and based on the determination, causing the first machine to send the second content to the second machine in response to a request for the second content from the first machine.

In yet a further embodiment of the disclosed method, the method may include determining whether the first machine and the second machine are in communication via a local area network and, based on the determination, receiving a request for a content identifier for the second content, sending the content identifier to the second machine for displaying the second content.

In another embodiment of the disclosed method, the method may further include sending an update notification that the first machine has received a selection of the portion of the first content of the website, wherein the update notification causes the second content to be sent to the second machine.

In a further embodiment of the disclosed method, the first machine communicates with the website using a first communication channel, the second machine communicates with the website using a second communication channel, and the first communication channel and the second communication channel are different communication channels.

In yet another embodiment of the disclosed method, the first content includes particular information about a product or service offered by the website and the second content includes a user-configurable portion of the first content.

This disclosure also provides for a system that may include a non-transitory, computer-readable medium storing computer-executable instructions, and one or more processors in communication with the non-transitory, computer readable medium that, when the computer-executable instructions are executed, are configured to receive a linking instruction to link a display of second content of a website on a second machine to a selection of a portion of first content of the website by a first machine, the second content being complementary to the first content, and cause a display of the first content on the first machine. The one or more processors may also be configured to receive the selection of the portion of the first content displayed on the first machine, and based on the portion of the first content being selected, cause the display of the second content on the second machine based on the linking instruction.

In another embodiment of the system, the first machine is associated with a user identifier having been provided during a first session of use of the website, the user identifier uniquely identifying a user of the website, the second machine associated with the user identifier having been provided during a second session of use of the website, and the one or more processors are further configured to receive a request for the linking instruction based on the second session overlapping in time with the first session.

In a further embodiment of the disclosed system, the one or more processors are further configured to cause a display of a linking identifier that identifies the first machine, wherein the linking instruction is received in response to a confirmation that the linking identifier is correctly displayed.

In an additional embodiment of the disclosed system, the one or more processors may be configured to cause a change in the first content displayed by the first machine based on an input received by the second machine.

In yet another embodiment of the disclosed system, the one or more processors are further configured to determine whether the first machine and the second machine are in communication via a local area network, and based on the determination, cause the first machine to send the second content to the second machine in response to a request for the second content from the first machine.

In yet a further embodiment of the disclosed system, the one or more processors are further configured to determine whether the first machine and the second machine are in communication via a local area network, and based on the determination, receive a request for a content identifier for the second content, send the content identifier to the second machine for displaying the second content.

In another embodiment of the system, the one or more processors are further configured to send an update notification that the first machine has received a selection of the portion of the first content of the website, wherein the update notification causes the second content to be sent to the second machine.

In a further embodiment of the system, the first machine communicates with the website using a first communication channel, the second machine communicates with the website using a second communication channel, and the first communication channel and the second communication channel are different communication channels.

In yet another embodiment of the system, the first content includes particular information about a product or service offered by the website and the second content includes a user-configurable portion of the first content.

This disclosure also provides for a non-transitory, computer-readable medium storing computer executable instructions that, when executed by one or more processors, cause the one or more processors to perform a method that may include receiving, by one or more processors, a linking instruction to link a display of second content of a website on a second machine to a selection of a portion of first content of the website by a first machine, the second content being complementary to the first content, and displaying, by a display in communication with the one or more processors, the first content on the first machine. The method may also include receiving the selection of the portion of the first content displayed on the first machine, and based on the portion of the first content being selected, causing the display of the second content on the second machine based on the linking instruction.

In another embodiment of the non-transitory, computer-readable medium, the first machine is associated with a user identifier having been provided during a first session of use of the website, the user identifier uniquely identifying a user of the website, the second machine associated with the user identifier having been provided during a second session of use of the website, and the method further comprises receive a request for the linking instruction based on the second session overlapping in time with the first session.

In an additional embodiment of the non-transitory, computer-readable medium, the method may further include causing a change in the first content displayed by the first machine based on an input received by the second machine.

In a further embodiment of the non-transitory, computer-readable medium, the method further includes determining whether the first machine and the second machine are in communication via a local area network, and based on the determination, causing the first machine to send the second content to the second machine in response to a request for the second content from the first machine.

In yet another embodiment of the non-transitory, computer-readable medium, the method may include determining whether the first machine and the second machine are in communication via a local area network, and based on the determination, receiving a request for a content identifier for the second content, sending the content identifier to the second machine for displaying the second content.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to execute the instructions.

FIG. 1 illustrates a network architecture 100 in accordance with an example embodiment. A networked system 102, in the example forms of a network-based marketplace or publication system, provides server-side functionality, via a network 104 (e.g., the Internet or a Wide Area Network (WAN)) to one or more client machines. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An API server 114 and a web server 116 are coupled to, and provide programmatic and web interfaces respectively to, one or more application servers 118. The application servers 118 host one or more applications, such as a marketplace application(s) 120, a payment application(s) 122, and one or more real-time communication application(s) 132. The application servers 118 are, in turn, shown to be coupled to one or more database servers 124 that facilitate access to one or more databases 126.

The marketplace application(s) 120 may provide a number of marketplace functions and services to users who access the networked system 102. The payment application(s) 122 may likewise provide a number of payment services and functions to users. The payment application(s) 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace application(s) 120.

The application server 118 may also include one or more real-time communication application(s) 132 to facilitate real-time, or substantially near real-time, communication between one or more of the machines shown in FIG. 1, such as between client machine 110 and client machine 112. In one embodiment, the real-time communication application(s) 132 may determine whether a user has initiated a first session of use with a server (e.g., API server 114 or web server 116) on a first machine and a second session of use with the server on a second machine. The real-time communication application(s) 132 may detect whether the first session overlaps in time with the second session. The real-time communication application(s) 132 may then query the user as to whether the user desires to link communications between the first machine and the second machine. Alternatively, or in addition, a user account for the user may be configured to allow multiple logins (e.g., from the same user and/or a different user), and the real-time communication application(s) 132 may be configured to wait until the user has initiated the linking of the client machines 110-112.

The real-time communication application(s) 132 may then facilitate communications between the first machine and the second machine such that, when first content is displayed by a server (e.g., the web server 116) and is selected by the user at the first machine, second content is then displayed at the second machine. For example, the first content may be a list of items (e.g., hats, perfumes, desktop computers, etc.) matching a given search query, and when an item is selected from the list, the second content may be features for the selected item (e.g., hat size, perfume price, desktop processor speed, etc.). In this way, the second content displayed by the second machine may help the user more rapidly compare items and, if the user desires to purchase one of the items, decide which of those items to purchase.

In determining the second content to display, the real-time communication application(s) 132 may be previously configured with the second content to send to the first and/or second machine. As discussed below, in some embodiments, the real-time communication application(s) 132 may send the second content to the first machine for passing along to, and displaying on, the second machine. In other embodiments, the real-time communication application(s) 132 may send the second content to the second machine for display.

Furthermore, the real-time communication application(s) 132 may be configured with the features to display on the second machine. For example, if an item selected by the first machine is displayed as having fifteen features, the real-time communication application(s) 132 may be configured to cause the display of a select subset of those fifteen features (e.g., ten features, five features, etc.). Alternatively, a user of the first machine may configure which of the second content is to be displayed on the second machine. In this way, the second content displayed on the second machine may be those features that the user believes are more relevant or more important to him or her. In an alternative embodiment, selection of the item on the first machine may cause additional features not displayed by the first machine to be displayed on the second machine (e.g., more features are displayed on the second machine than are displayed by the first machine).

While the marketplace application(s) 120, the payment application(s) 122, and the real-time communication application(s) 132 are shown in FIG. 1 to form part of the networked system 102, it will be appreciated that, in alternative embodiments, the applications 120, 122, 132 may be separate or distinct from the system 102. For example, the payment application(s) 122 may form part of a payment service that is separate and distinct from the networked system 102.

Further, while the system 100 shown in FIG. 1 employs a client-server architecture, the embodiments are, of course not limited to such an architecture, and could equally well find application in a distributed, or peer-to-peer, architecture system, for example. The marketplace application(s) 120, the payment application(s) 120, the real-time communication application(s) 132 could also be implemented as standalone software programs, which do not necessarily have networking capabilities.

The web client 106 may access the marketplace application(s) 120, the payment application(s) 122, and the real-time communication application(s) 132 via the web interface supported by the web server 116. Similarly, the programmatic client 108 may access the various services and functions provided by the applications 120, 122, 132 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, payment, or advertising functions that are supported by the relevant applications of the networked system 102.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. FIG. 2 illustrates applications, in accordance with an example embodiment, executable by one or more application server(s) 118. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page on which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may, accordingly, include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make the listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such as, for example, messages advising users regarding the status of listings at the networked system 102 (e.g., providing "outbid" notices to bidders during an auction process or to providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

Furthermore, and referring back to FIG. 1, the real-time communication application(s) 132 may leverage one or more of the applications 200-232 in determining the secondary content for display on one or more secondary machines. In other words, the real-time communication application(s) 132 may invoke or use data gathered by the applications 200-232 in determining the secondary content (e.g., features for a selected item) displayed by one or more secondary machines linked to the primary machines. For example, the real-time communication application(s) 132 may obtain the features and/or feature values for selected items via such as application as the auction application(s) 202, the fixed-price application(s) 204, the store application(s) 206, or combinations thereof.

As the real-time communication application(s) 132 may be integrated (e.g., directly or indirectly) with the application server 118, the real-time communication application(s) 132 may leverage the data obtained from the applications 200-232 to display secondary content on one or more secondary machines. This integration may further extend to the one or more database server(s) 124 and/or database(s) 126 in communication with the application server(s) 118. As discussed below, the real-time communication application(s) 132 may access stored information to retrieve the secondary content, and send such retrieved secondary content to the one or more secondary machines (directly or indirectly) for display by the one or more secondary machines.

Figure 3:
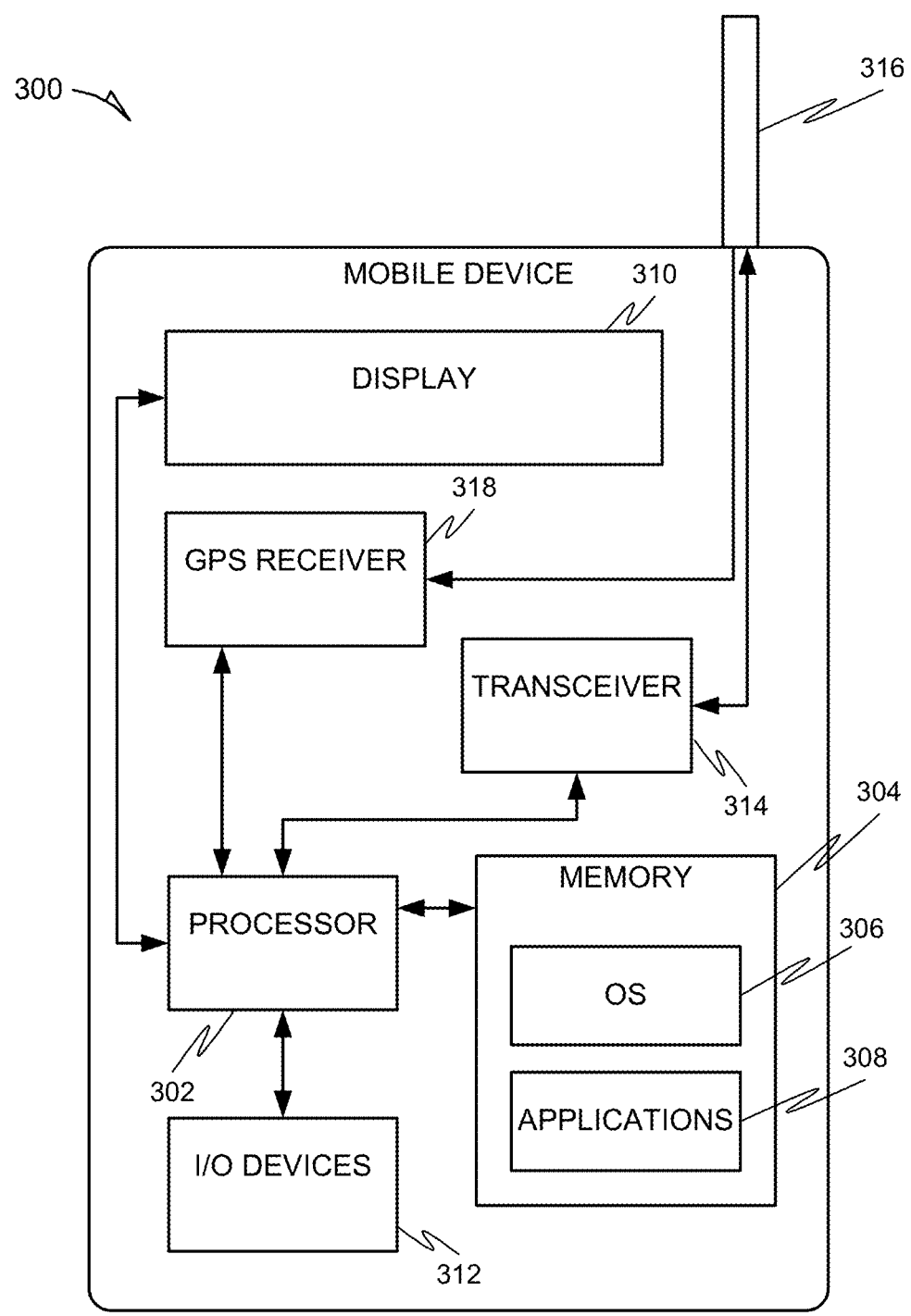
FIG. 3 illustrates a client machine in accordance with an example embodiment.

FIG. 3 illustrates a client machine 110 in accordance with an example embodiment. In one embodiment, the client machine 110 is a mobile device 300. The mobile device 300 includes one or more processors 302. The one or more processors 302 may be any of a variety of different types of commercially available processors suitable for mobile devices (e.g., an ARM architecture microprocessor, a Microprocessor without Interlocked Pipeline Stages (MIPS) architecture processor, or another type of processor). A memory 304, such as a random access memory (RAM), a Flash memory, or other type of memory, is typically accessible to the one or more processors 302. The memory 304 may be adapted to store an operating system (OS) 306, as well as application programs 308, such as a mobile location enabled application that can provide location-based services to a user. The one or more processors 302 is coupled, either directly or via appropriate intermediary hardware, to a display 310 and to one or more input/output (I/O) devices 312, such as a keypad, a touch panel sensor, a microphone, and the like. Similarly, in some embodiments, one or more processors 302 is coupled to a transceiver 314 that interfaces with an antenna 316. The transceiver 314 may be configured to both transmit and receive cellular network signals, wireless data signals, or other types of signals via the antenna 316, depending on the nature of the mobile device 300. Further, in some configurations, a GPS receiver 318 may also make use of the antenna 316 to receive GPS signals.

Figure 4:
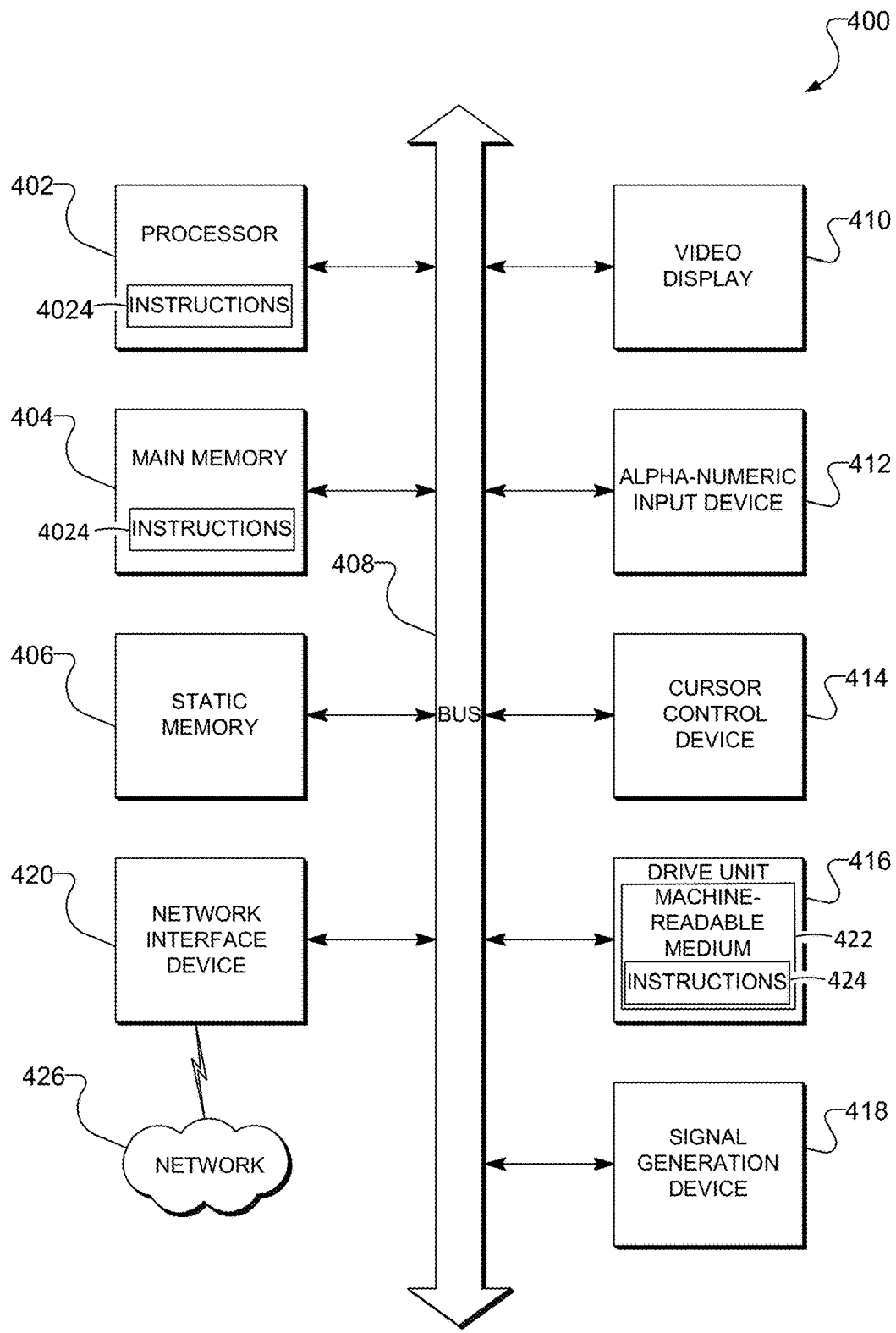
FIG. 4 is a block diagram illustrating components of a machine, according to some example embodiments, able to read instructions from a machine-readable medium and perform any one or more of the methodologies discussed herein, according to aspects of the disclosure.

FIG. 4 is a block diagram illustrating components of a machine, according to some example embodiments, able to read instructions from a machine-readable medium and perform any one or more of the methodologies discussed herein, according to aspects of the disclosure. In particular, FIG. 4 illustrates an example computer system 400 within which instructions 424 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation (or cursor control)

device 414 (e.g., a mouse), a disk drive unit 416, a signal generation device 418 (e.g., a speaker) and a network interface device 420.

The disk drive unit 416 includes a non-transitory machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404 and/or within the processor 402 during execution thereof by the computer system 400, the main memory 404 and the processor 402 also constituting non-transitory, machine-readable media. The instructions 424 may also reside, completely or at least partially, within the static memory 406.

While the machine-readable medium 422 is shown in an example embodiment to be a single medium, the term "machine-readable medium" may include a single medium or multiple media (e.g., a centralized or distributed database, and/or associated caches and servers) that store the one or more instructions 424 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 424 may further be transmitted or received over a communications network 426 using a transmission medium. The instructions 424 may be transmitted using the network interface device 420 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Figure 5:
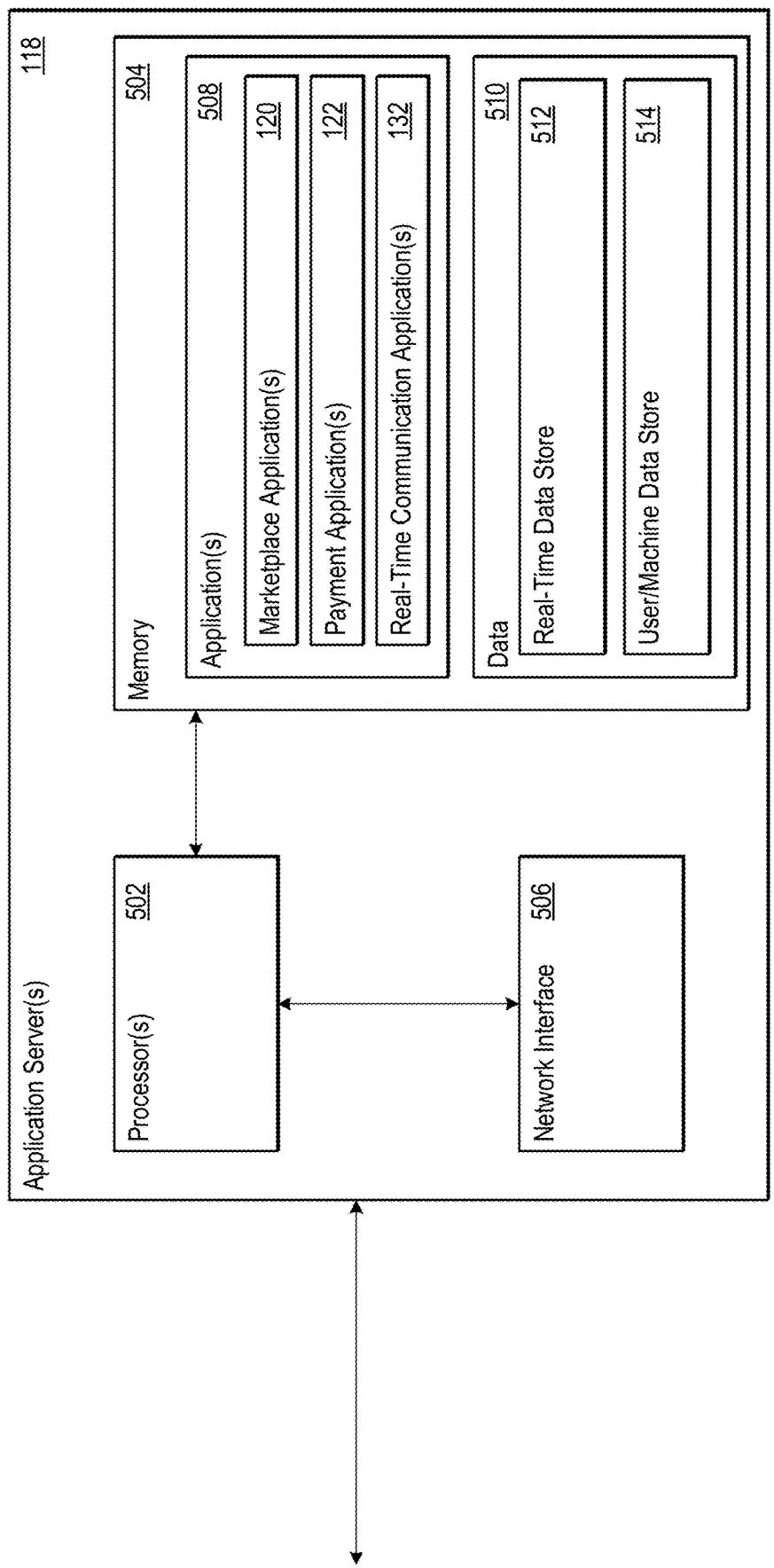
FIG. 5 is a block diagram illustrating components of an application server, according to an example embodiment, having various real-time communication components.

FIG. 5 is a block diagram illustrating components of an application server 118, according to an example embodiment, having various real-time communication components. As shown in FIG. 5, the application server(s) 118 may include one or more processors 502, a non-transitory, computer-readable memory or collection of such memories 504, and a network interface 506. The network interface 506 may facilitate communications between the application server(s) 118 and any of the other machines shown in FIG. 1.

The memory 504 may include one or more applications 508 and data 510 to support applications 508. The applications 508 may include the one or more marketplace application(s) 120, the one or more payment application(s) 122, and the one or more real-time communication application(s) 132. The data 510 may be accessed or used by the one or more applications 508, such as the one or more real-time communication application(s) 132. Although the data 510 is shown as being housed within the same block as the real-time communication application(s) 132, the data 510 may be housed or stored in other locations, such as the database(s) 126, and accessed via an intermediary machine, such as the database server(s) 124.

The real-time communication application (s) 132 may include one or more applications that select facilitate real-time, or near real-time, communications between a primary machine and one or more secondary machines. In various embodiments, the real-time communication application(s) 132 may include one or more scripts, protocols, or definitions as described in "WebRTC 1.0: Real-time Communication Between Browsers," or in "Customizable, Ubiquitous Real-Time Communication Over the Web," both of which are incorporated by reference herein, or in combinations thereof. For example, the real-time communications application(s) 132 may implement an Interactive Connectivity ("ICE") framework, one or more Session Traversal Utilities for NAT ("STUN") servers, one or more Traversal Using Relays around NAT ("TURN") servers, or various combinations thereof. This assortment and/or combination of real-time communication application(s) 132 may make it possible for a primary machine to communicate with one or more secondary machines. In particular, these protocols and/or frameworks may inform a primary machine of the Internet Protocol ("IP") addresses, ports, sockets, and other such network information, assigned to or used by one or more secondary machines such that the primary machine may communicate directly or indirectly with the one or more secondary machines. An exemplary arrangement and implementation of such protocols and/or frameworks is described in "Introduction to WebRTC architecture," which is incorporated by reference herein.

The real-time communication application(s) 132 may also monitor whether a user has initiated different sessions with one or more servers of FIG. 1 (e.g., the API server 114, the web server 116, and/or the application server(s) 118) using different machines. Accordingly, the real-time communication application(s) 132 may store and/or retrieve information from various data stores, such as the real-time data store 512 and/or a user/machine data store 514. The user/machine data store 514 may maintain an account of which machines have active sessions by a user, and which machines should be linked as primary and secondary machine(s). The real-time data store 512 may store messages received from the primary machine informing the real-time communication application(s) 132 when content should be sent to one or more secondary machines.

As one example, and as discussed below, when a user first accesses one or more of the servers 114-118 with a machine (e.g., the user's primary machine), the real-time communication application(s) 132 may create an entry in the user/machine data store 514 associating the user with the primary machine. When the user then accesses one or more of the servers 114-118 with a second machine (e.g., the secondary machine), the real-time communication application(s) 132 may reference the user/machine data store 514 to determine whether the user has already initiated a session with one or more of the servers 114-118 and, if so, whether the second machine now being used to access one or more of the servers 114-118 is different from the first machine. If the machines are different, the real-time communication application(s) 132 may cause the display of a prompt to the user as to whether the user desires to link the first machine with the second machine. Where the real-time communication application(s) 132 receives a linking instruction, the real-time communication application(s) 132 may update the user/machine data store 514 to reflect that the first machine and the second machine are linked, and which of the machines is the primary machine and which machine is the secondary machine.

In an additional or alternative implementation, a user other than the user of the first machine may be using the second machine, and the user of the second machine and/or the user of the first machine may authorize the linking of the first and second machines. For example, a Short Messaging System ("SMS") message may be sent to the first and/or second user, and a reply to the SMS message may authorize the linking of the first and second machines.

As the user then browses the electronic marketplace hosted by one or more of the servers 114-118 on the primary machine, content may be displayed on the second machine in response to selections of content on the primary machine.

The content displayed on the one or more secondary machines may be complementary to, or a subset of, the content displayed by the primary machine. In other words, the content displayed by the one or more secondary machines may be related to the content displayed by the primary machine. In one embodiment, the content for display on the one or more secondary machines may be controlled by a script, such as a JavaScript script, that is invoked when a user selects content, or a portion thereof, displayed on the primary machine.

Alternatively, or in addition, to the foregoing embodiment, a user may initiate the linking of a primary machine with one or more secondary machines. For example, after a user has accessed the one or more servers 114-118 with a primary machine and a secondary machine, the user may select an element (e.g., a hyperlink) displayed by the primary machine and/or secondary machine that instructs the real-time communication application(s) 132 to initiate a link between the primary machine and the secondary machine. Thus, the user may have manual control over when the primary machine and one or more secondary machines should be linked. This manual control may be useful in instances where the user may have previously declined a prompt from the real-time communication application(s) 132 to link the primary machine and the one or more secondary machines, but desires to have such linking.

After a primary machine has been linked with one or more secondary machines, communications between the linked machines may be direct or indirect. As discussed below with reference to FIG. 6, a direct communication may be where the primary machine and the one or more secondary machines reside on the same Local Area Network ("LAN"), even if the machines are on different subnets. As discussed below with reference to FIG. 7, an indirect communication may be where the primary machine and the one or more secondary machines reside on different LANs.

Furthermore, content transferred between the primary machine and the one or more secondary machines may be in a peer-to-peer fashion or may leverage the application server(s) 118 to act as an intermediary. In one embodiment, the mode of operation between the primary machine and the one or more secondary machines may be based on testable factors, such as a network speed between the primary machine and the one or more secondary machines. For example, a given mode of operation (e.g., peer-to-peer or intermediary) may be selected based on a detected network speed below (or above) a predetermined threshold for network speed. Variations or combinations of these operating modes are also possible.

In a peer-to-peer mode, when content is selected by the user on the primary machine, the primary machine may send a request to one or more secondary machines to display complementary content. In this example, the primary machine may request the complementary content from one or more of the servers 114-118, and the one or more servers 114-118 may send the complementary content to the primary machine, which may then communicate the complementary content to the one or more secondary machines. Alternatively, the primary machine may send a request to the one or more secondary machines to display complementary content, and the one or more secondary machines may then send a request to the one or more servers 114-118 for the complementary content. For example, the primary machine may provide a Uniform Resource Location ("URL") for the complementary content to the one or more secondary machines, which may then request the complementary content from the one or more servers 114-118 located at the provided URL.

In an intermediary mode, the real-time communication application(s) 132 may act as an intermediary between the linked machines (e.g., between the primary machine and the one or more secondary machines). For example, when content displayed on the primary machine is selected by the user, a message may be sent to the real-time data store 512 informing the real-time communication application(s) 132 that the primary machine is requesting that complementary content be sent to the one or more secondary machines. The real-time communication application(s) 132 may then reference the user/machine data store 514 to determine which one or more secondary machines are linked to the requesting primary machine, and the real-time communication application(s) 132 may then send the requested complementary content to the one or more secondary machines accordingly. When operating in an intermediary mode, the primary machine and the one or more secondary machines may or may not be in communication via the same LAN or a subnet thereof. In one embodiment, the intermediary mode may be invoked or requested when the primary machine, the one or more secondary machines, and/or the application server(s) 118 determines that network conditions are such that peer-to-peer communication between the primary machine and the one or more secondary machines may be unreliable (e.g., transmissions take an inordinate amount of time to travel, there is significant packet loss, there is an unacceptable amount of jitter in the sent or received data, etc.).

Figure 6:
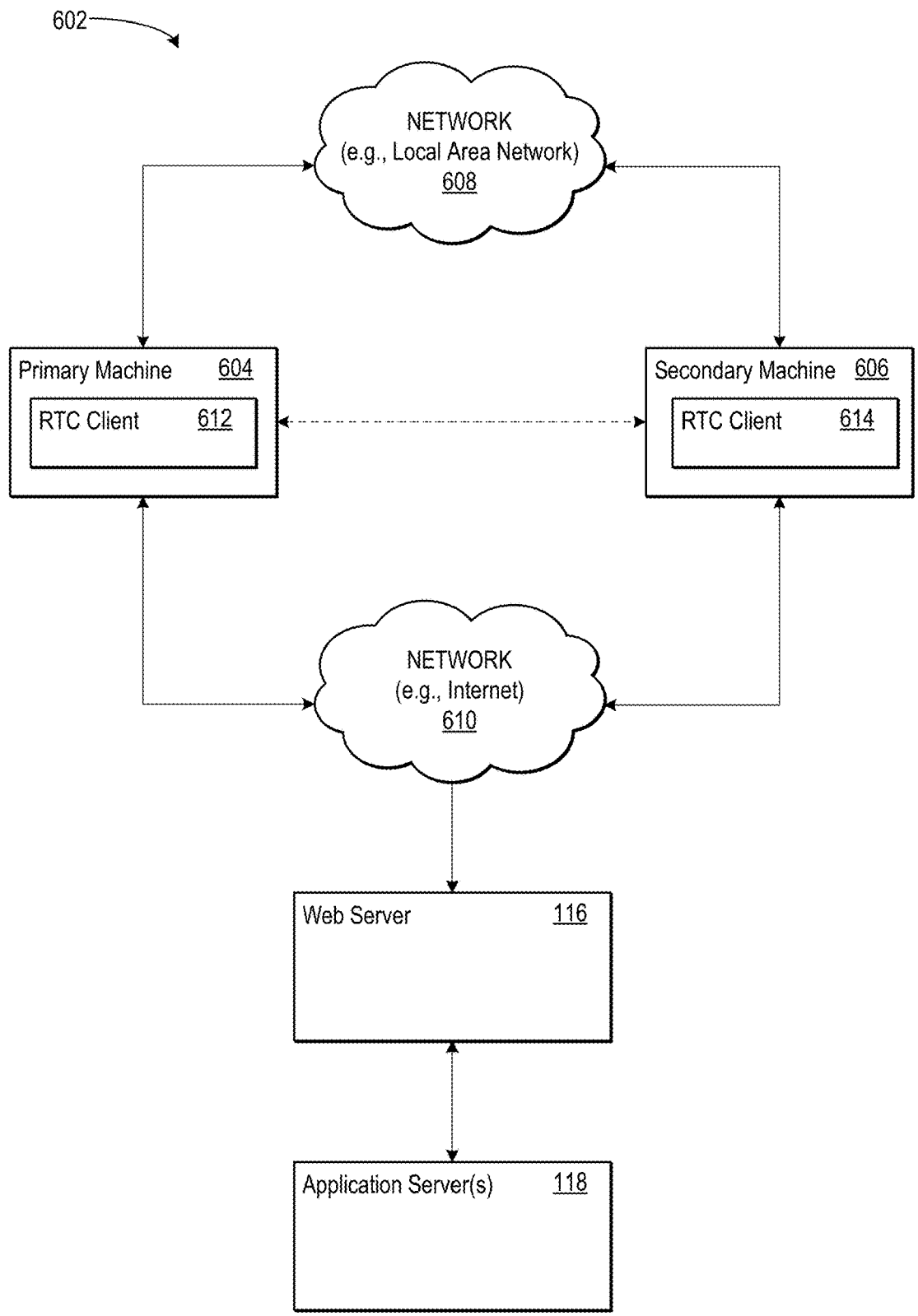
FIG. 6 illustrates another network architecture, in accordance with another example embodiment, where a primary machine is in communication with a secondary machine for displaying complementary content.

FIG. 6 illustrates another network architecture 602, in accordance with another example embodiment, where a primary machine 604 is in communication with a secondary machine 606 for displaying complementary content. In one embodiment, the primary machine 604 may be a mobile device, such as a smartphone, and the secondary machine 606 may be a portable device, such as a laptop, netbook, tablet, or other such portable device. As shown in FIG. 6, the primary machine 604 and the secondary machine 606 may each implement or instantiate a real-time communication client 612 and 614, respectively. In one embodiment, real-time communication clients 612, 614 may each be an Internet browser, such as Internet Explorer, Mozilla Firefox, Google Chrome, etc., that supports the WebRTC protocols and definitions.

The primary machine 604 and the secondary machine 606 may communicate with each other via a LAN 608 and may communicate with the web server 116 and/or the application server 118 via a Wide Area Network 610 (e.g., the Internet). Where the primary machine 604 and the secondary machine 606 are in communication via the LAN 608, the primary machine 604 may request complementary content from one or more of the servers 116-118 and, when the complementary content is received, send that complementary content to the secondary machine 606. In this way, the secondary machine 606 may not need to expend resources in attempting to retrieve or request the complementary content from one or more of the servers 116-118. In an alternative embodiment, the primary machine 604 may send a URL of the complementary content to the secondary machine 606, and the secondary machine 606 may then request the complementary content from the one or more of the servers 116-118. Combinations of the foregoing are also possible.

Figure 7:
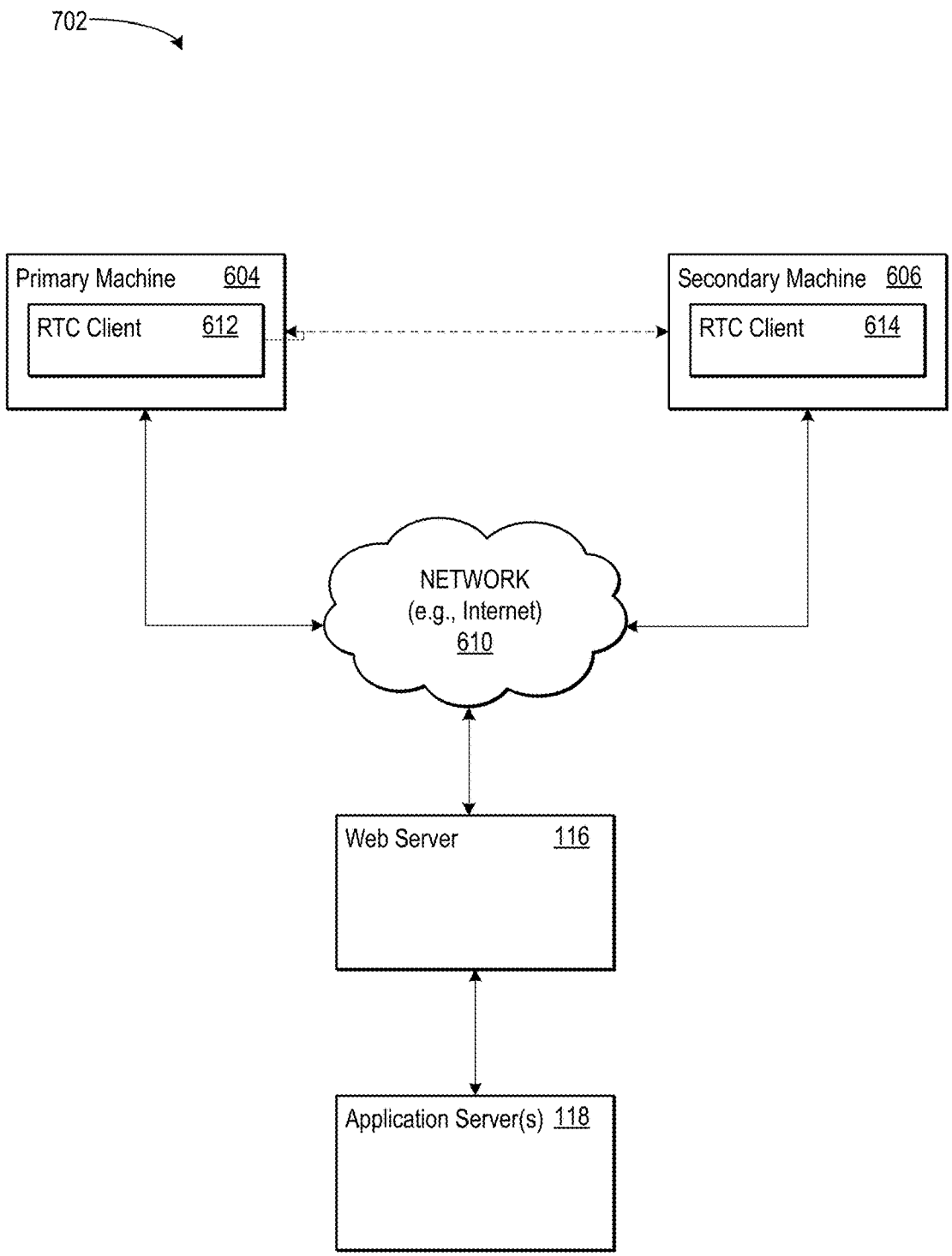
FIG. 7 illustrates yet another network architecture, in accordance with a further example embodiment, where the primary machine is in communication with the secondary machine for displaying complementary content.

FIG. 7 illustrates yet another network architecture 702, in accordance with a further example embodiment, where the primary machine 604 is in communication with the secondary machine 606 for displaying complementary content. While the primary machine 604 and the secondary machine 606 may not be in communication via the LAN 608, the primary machine 604 and the secondary machine 606 may nonetheless communicate with each other (e.g., communicate in a peer-to-peer mode). Further still, the communication channels employed by the primary machine 604 and the secondary machine 606 may be different. For example, the primary machine 604 may communicate using a first communication channel (e.g., Ethernet, 802.11 a/b/g, CDMA, LTE, etc.) and the secondary machine 606 may communicate using a second communication channel (e.g., Ethernet, 802.11 a/b/g, CDMA, LTE, etc.). As each of the primary machine 604 and the secondary machine 606 may establish a connection with the application server(s) 118, the application server(s) 118 may obtain network information (e.g., public IP addresses, communication ports, etc.) from each machine 604, 606. The primary machine 604 may then use the network information of the secondary machine 606 obtained by the application server(s) 118 to communicate with the secondary machine 606.

However, in some instances, the communication between the primary machine 604 and the secondary machine 606 may be unreliable or undesirable (e.g., unacceptable packet losses, malformed packets, unacceptable packet delays, etc.). Accordingly, under these conditions, the primary machine 604 and the secondary 606 may communicate in an intermediary mode. As previously discussed, the primary machine 604 and the secondary machine 606 may leverage the application server(s) 118 to act as an intermediary for the machines 604, 606. In this intermediary mode, when the primary machine 604 communicates a request that complementary content should be displayed on the secondary machine 606, the primary machine 604 may send the request to the application server(s) 118, which may then fulfill the request by sending the requested complementary content to the secondary machine 606 for display. Accordingly, regardless of whether the primary machine 604 and the secondary machine 606 are on the same network (e.g., communicating using the same LAN) or whether the primary machine 604 and the secondary machine 606 communicate in a peer-to-peer mode or intermediary mode, complementary content requested by the primary machine 604 may be displayed on the secondary machine 606.

Figure 8:
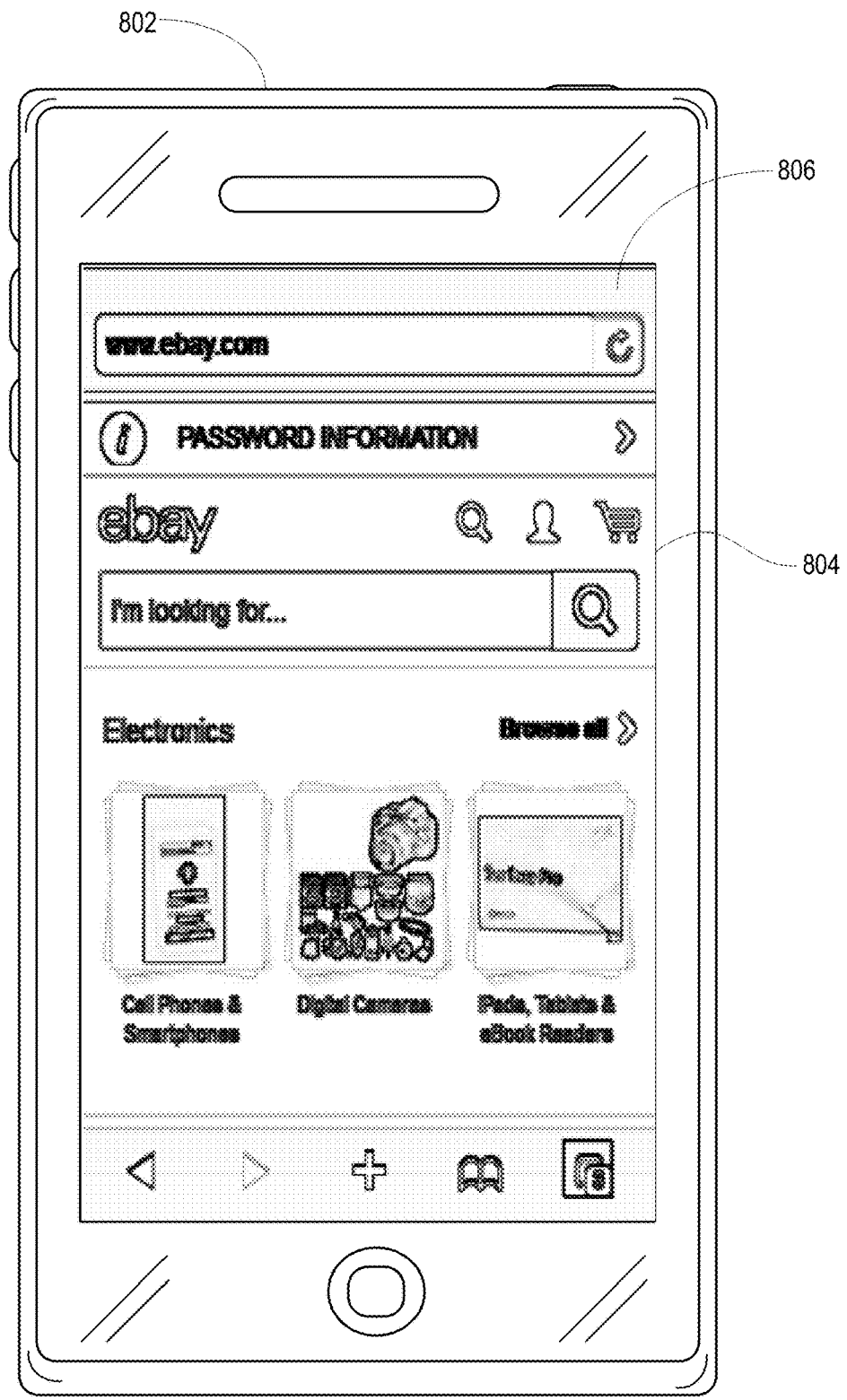
FIG. 8 illustrates a primary machine, in accordance with an example embodiment, displaying a webpage for an electronic marketplace.

FIG. 8 illustrates a primary machine 802, in accordance with an example embodiment, displaying a webpage 806 for an electronic marketplace. In one embodiment, the primary machine 802 may be a smartphone equipped with a display 804 for displaying the webpage 806. The webpage 806 may be provided by one or more of the servers 114-118, such as the web server 116 in conjunction with the application server(s) 118. In one embodiment, the user may provide authentication credentials (e.g., a user identifier, a username, a password, etc.) that identify the user via the webpage 806. The real-time communication application(s) 118 may use the authentication credentials to determine whether the user has initiated a second (or different) session with the servers 114-118 using a second machine. When such a determination is made, this determination may trigger the real-time communication application(s) 118 to display a prompt to the user inquiring whether the user desires to link the two machines. However, the user may also access the servers 114-118 anonymously (e.g., not provide any authentication credentials), in which case, the linking of the machines used by the user may be initiated manually by the user (e.g., by selecting a hyperlink or other object on the webpage 806).

When the authentication credentials are provided, the real-time communication application(s) 132 may maintain a record regarding the user's visit, such as the time when the user accessed the one or more servers 114-118, the public IP address of primary machine 802 used by the user to access the one or more servers 114-118, and a session identifier (or other identifier) that uniquely identifies the user's visit to the webpage 806 with the primary machine 802. This record may be stored in one or more data stores, such as the databases 126, the real-time data store 512, or combinations thereof. Furthermore, the record maintained by the real-time communication application(s) 132 may be time sensitive, such that it is deleted or removed after a predetermined time has elapsed where no activity has been detected with the primary machine 802 (e.g., the primary machine 802 has not requested or sent any data to one or more of the servers 116-118).

Figure 9:
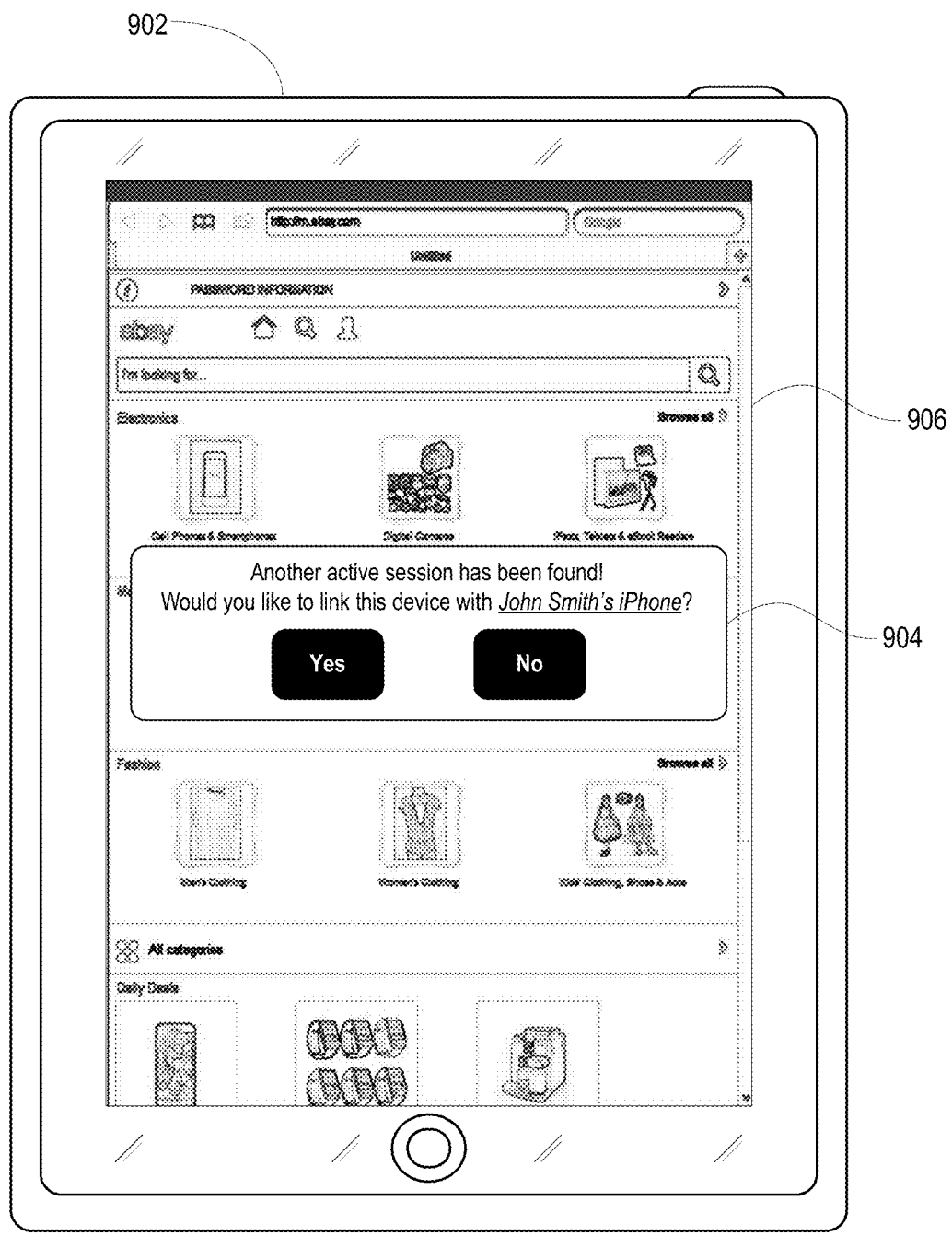
FIG. 9 illustrates a secondary machine, in accordance with an example embodiment, displaying a prompt requesting a linking instruction.

FIG. 9 illustrates a secondary machine 902, in accordance with an example embodiment, displaying a prompt 904 requesting a linking instruction. The secondary machine 902 may be a different machine than the primary machine 802 and, notably, may be of a different type of machine (e.g., the primary machine 802 may be a smartphone and the secondary machine 902 may be tablet). As shown in FIG. 9, the secondary machine 902 may display a webpage 906 of the electronic marketplace with the prompt 904 for the linking instruction overlaid thereon. As discussed previously, the prompt 904 may be displayed on the secondary machine 902 when the real-time communication application(s) 132 has detected and/or determined that the user of the primary machine 802 has also initiated a session with the one or more servers 114-118 via the secondary machine 902, such as where the user of the secondary machine 902 provides the same authentication credentials as the user of the primary machine 802. It should be understood that the user using the primary machine 802 may not necessarily be the same person as the user using the secondary machine 902, but that the user of the primary machine 802 and the user of the secondary machine 902 have provided the same authentication credentials.

Furthermore, the linking of the primary machine 802 and the secondary machine 902 may be initiated by the user. In this case, the primary machine 802 may display a linking identifier and the secondary machine 902 may also display the linking identifier. In one embodiment, the linking identifier may be a sequence of one or more alphanumeric characters. The user may be prompted to confirm that the same linking identifier is displayed on the primary machine 802 and the secondary machine 902. Alternatively, the user may be prompted to confirm that different linking identifiers are correctly displayed on corresponding machines, e.g., that a first linking identifier is correctly displayed on the primary machine 802 and a second linking identifier is correctly displayed on the secondary machine 902.

The prompt 904 for the linking instruction may also identify the primary machine 802 that has previously accessed the one or more servers 114-118 (e.g., "John Smith's iPhone"). Should the user of the secondary machine 902 (or the user of the primary machine 802) answer in the affirmative (e.g., that the primary machine 802 and the secondary machine 902 should be linked), a linking instruction may be communicated to the real-time communication application(s) 132 that the primary machine 802 and the secondary machine 902 are to be linked.

Figure 10:
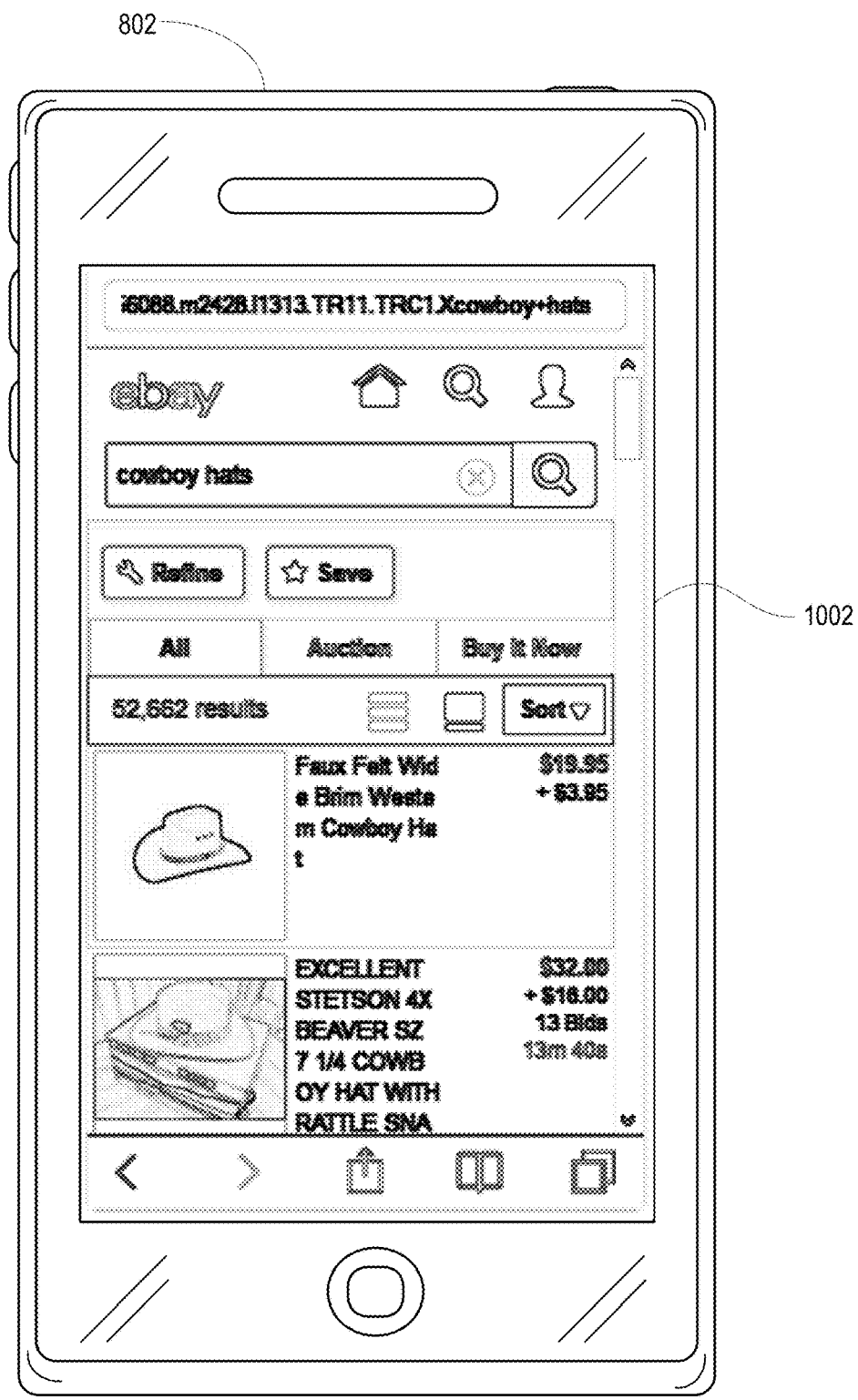
FIG. 10 illustrates the primary machine of FIG. 8 displaying a webpage of primary content in accordance with an example embodiment.

Once linked, complementary content may be displayed on the secondary machine 902 when a user selects content (or a portion thereof) displayed on the primary machine 802. FIG. 10 illustrates the primary machine 802 of FIG. 8 displaying a webpage of primary content in accordance with an example embodiment. In particular, FIG. 10 illustrates that a webpage 1002 of search results that have been returned in response to the search query "cowboy hats." The search results may include auction listings for items matching the received search query, fixed price listings for items matching the received search query, and other such listings or combinations thereof. Each of the one or more items (e.g., listings) in the list may be selectable, such that the user of the primary machine 802 may view details about the selected item. When an item is selected, a subset of information about the selected item may be displayed on the linked secondary machine 902. In this fashion, the user may view details about the selected item on the primary machine 802, and the secondary machine 902 can keep track of which items the user has previously viewed.

Alternatively, or in addition, selecting content on the secondary machine 902 may affect the content displayed on the primary machine 802. For example, selecting an item displayed by the secondary machine 902 may cause details about the item to be displayed on the primary machine 802. In this manner, a user may use the secondary machine 902 to control the display of content (or a portion thereof) on the primary machine 802.

Figure 11A:
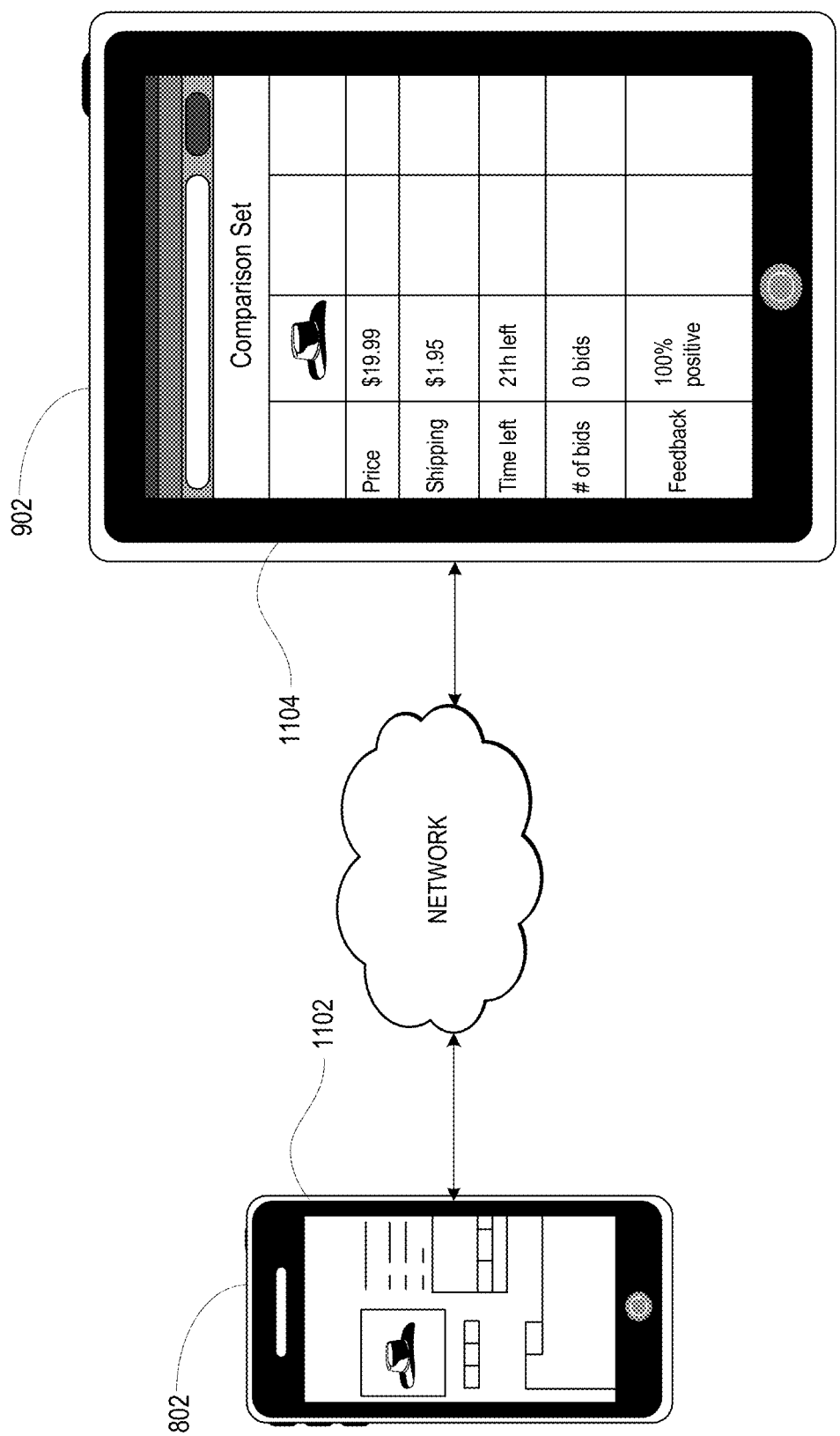
FIGS. 11A-11C illustrate an arrangement, in accordance with an example embodiment, where selection of the primary content displayed on the primary machine has caused the display of secondary content on the secondary machine.
Figure 11B:
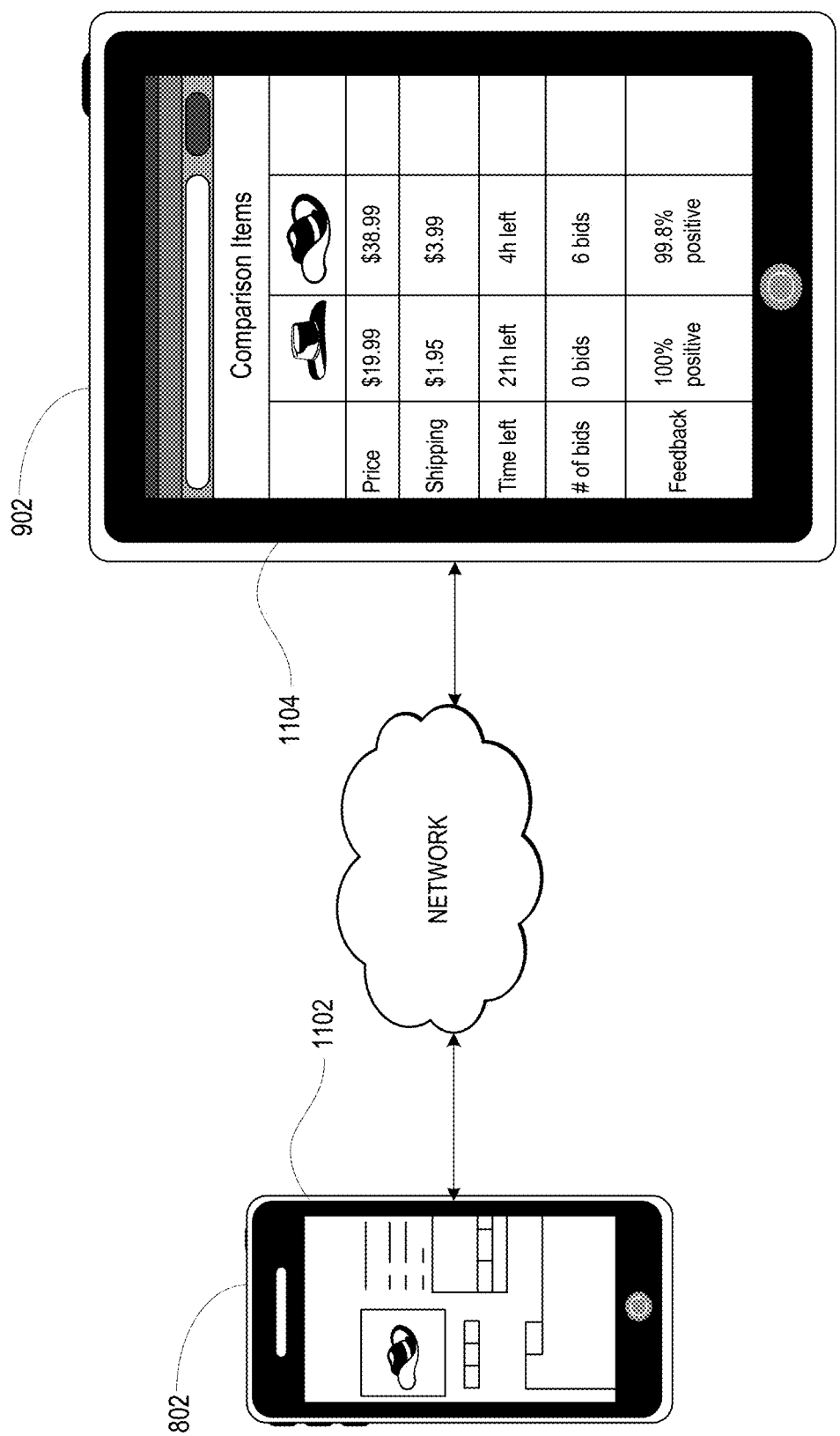
Figure 11C:
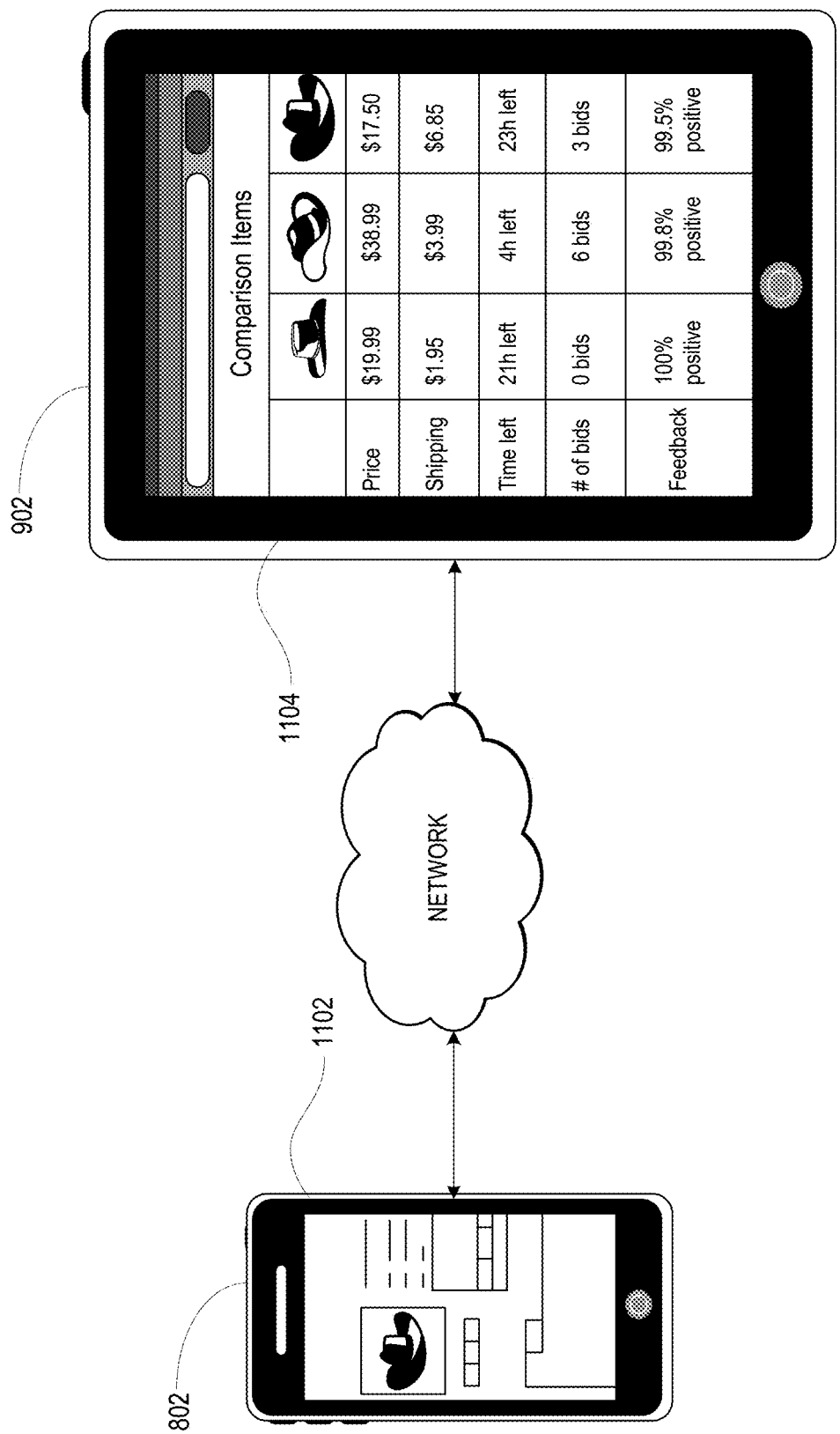

FIGS. 11A-11C illustrate an arrangement, in accordance with an example embodiment, where selection of the content displayed on the primary machine 802 has caused the display of content on the secondary machine 902. The primary machine 802 may display a webpage 1102 (or other electronic document) that has details about an item selected by a user. When the item is selected, one or more features about the item may then be displayed on the secondary machine 902 as a separate webpage 1104 (or other electronic document). As shown in FIGS. 11A-11C, the complementary content about the selected item may include such features as the item's price, shipping cost, time left for bidding on the item, number of bids received for the item, and the amount and/or type of feedback the seller of the item has received. As shown in FIGS. 11A-11C, each time a user selects an item from the webpage 1002, the details about the item may be displayed on the webpage 1102, and the features about the selected item may be displayed on the webpage 1104.

Although FIGS. 11A-11C illustrate a specific set of features being displayed as the complementary content (e.g., price, brand, shipping cost, time left, number of bids, and feedback rating(s)), the complementary content displayed on the secondary machine 902 may be configurable by a user. For example, the user may specify an alternative set of features to be displayed as the complementary content.

Alternatively, or in addition, the complementary content displayed on the secondary machine 902 may be dependent on the items selected by the user, such that a first type of items (e.g., auctions or fixed price listings for automobiles) may have a different set of features displayed on the secondary machine 902 than a second type of items (e.g., auctions or fixed price listings for clothing). In one embodiment, the item-dependent attributes may be based on one or more categories used to filter search results when a search is conducted for auction or fixed price listings. For example, a category for digital cameras may be "megapixels" (e.g., the number of megapixels captured by the digital camera) and the item-dependent attributes may include the megapixel category. In a further embodiment, the item-dependent attributes may be based on those filter categories most used by users to filter search results (e.g., the top two filters, the top three filters, etc.). In yet an alternative embodiment, the item-dependent attributes may be selected based on which filter categories or item attributes have the greatest variance. Where a user has selected multiple items that have a great degree of variance in a particular attribute (e.g., megapixels, memory size, weight, etc.), the variance of the attribute may signify that the item attribute is important to the user. Accordingly, the item attribute may be included in the complementary content displayed by the secondary machine 902.

In addition, the application server(s) 118 and/or the real-time communication application(s) 132 may maintain a record of the items selected by the user or a record of the user's session. For example, a record of the user's session may be stored in the real-time data store 512, the user/machine data store 514, or another storage (e.g., database(s) 126). In this way, should a user decide to stop browsing or selecting items during a first session, the user may resume adding to the complementary content during a second session upon a subsequent visit to the electronic marketplace.

Furthermore, the secondary machine 902 may be configured to display different sets of complementary content. For example, and as explained above, different types of items (e.g., automobiles and clothing) may have a different set of features displayed on the secondary machine 902. However, the secondary machine 902 may be configured to display multiple sets of complementary content such that when an item from a first type of items is selected (e.g., a truck), the secondary machine 902 displays a set of features for the first type of items, and when an item from a second type of items is selected (e.g., a shirt), the secondary machine 902 then displays a set of features for the second type of items. In one embodiment, the secondary machine 902 may display features for the first type of items in a first "tab" and/or window of a web browser and the features for the second type of items may be displayed in a second "tab" and/or window of the web browser. Thus, the disclosed systems and methods afford the user the flexibility to view different types of items during the same session while displaying complementary content specific to the different types of items.

In addition, the real-time communication application(s) 132 may be configured to alter or manipulate the content displayed on the primary machine 802 to indicate whether an item shown on the primary machine 802 is an item appearing in the complementary content shown on the secondary machine 902. For example, an icon, text, sound, or other audiovisual indicator, may be displayed adjacent to an item displayed on the primary machine 802 indicating that the item is also part of the complementary displayed on the secondary machine 902. In this way, the disclosed systems and methods provide an efficient manner in which to inform the user as to whether an item is part of the content displayed on the secondary machine 902.

Moreover, the complementary content displayed on the secondary machine 902 may or may not be static. In other words, a user may choose whether an item displayed as part of the complementary content remains part of the complementary content. Thus, a user may choose to remove an item displayed in the complementary content after having added the item to the complementary content. Removing the item from the complementary content may affect the content displayed on the primary machine 802. For example, removing the item from the complementary content may cause the removal of the audiovisual indicator displayed on the primary machine 802 indicating that the item is part of the complementary content.

Figure 12A:
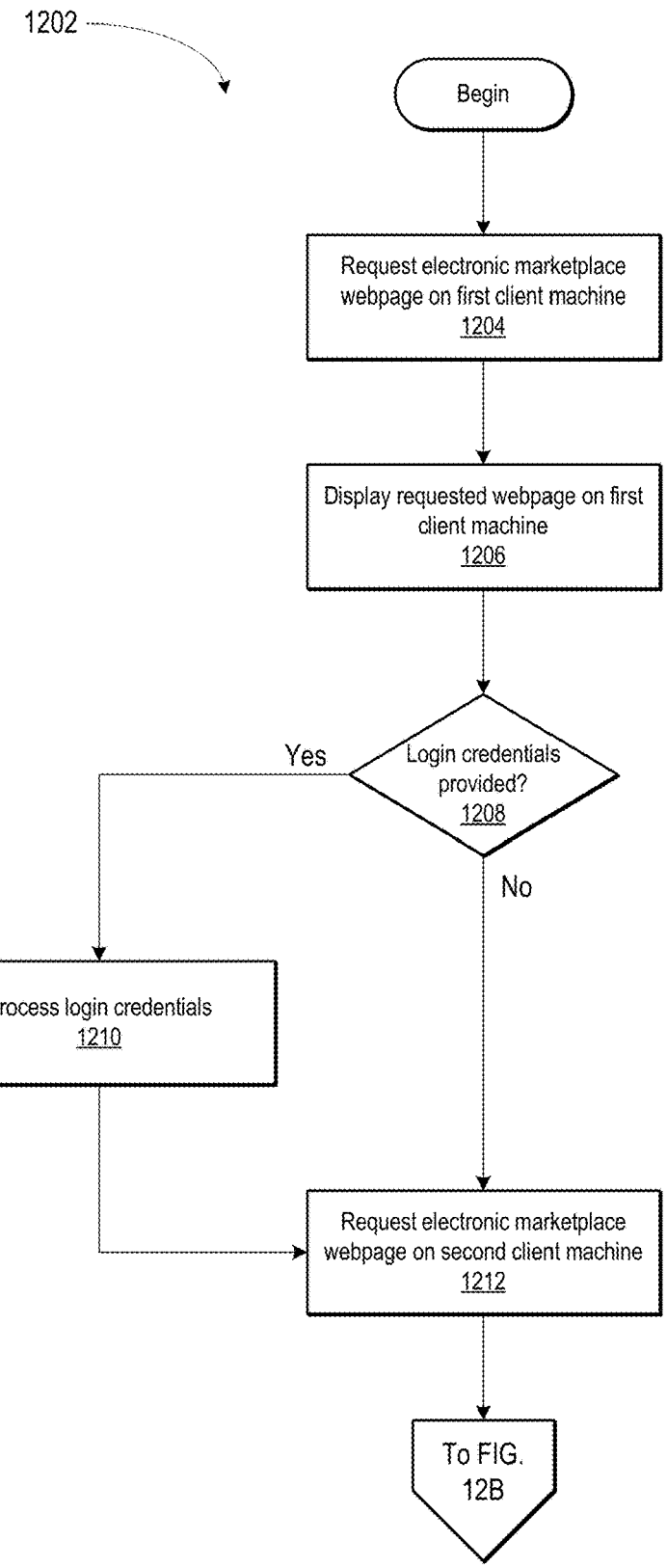
FIGS. 12A-12B illustrate a method, in accordance with an example embodiment, for linking a primary machine and a secondary machine.
Figure 12B:
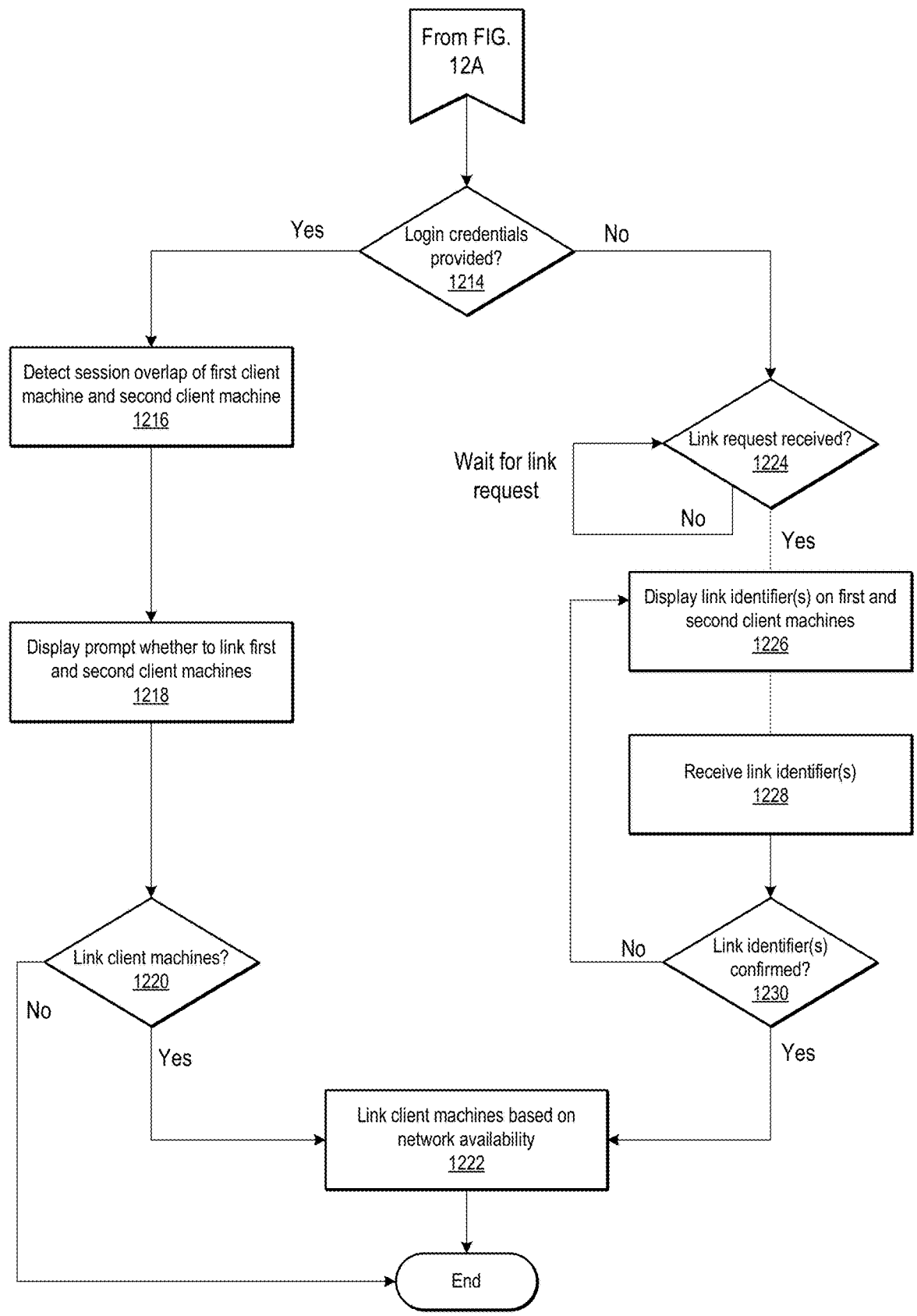

FIGS. 12A-12B illustrate a method 1202, in accordance with an example embodiment, for linking a primary machine (e.g., machine 802) and a secondary machine (e.g., machine 902). The method 1202 may be implemented by the primary machine 802 and/or the secondary machine 902 and, accordingly, is merely described by reference thereto. Initially, a first client machine (e.g., the primary machine) may request a webpage from an electronic marketplace (Operation 1204). The requested webpage may then be displayed on the first client machine (Operation 1206). The user of the first client machine may then provide login credentials (e.g., authentication credentials) identifying himself or herself (Operation 1208). Where login credentials are provided, the real-time communication application(s) 132 may associate the provided login credentials with an identifier that identifies the first client machine, such as a MAC address or session identifier (Operation 1210).

Thereafter, regardless of whether the user has provided login credentials, the user (e.g., the same user) may then access a webpage for the electronic marketplace with a second client machine (e.g., the secondary machine) (Operation 1212). The real-time communication application(s) 132 may then determine whether the user has provided login credentials (e.g., authentication credentials) via the second client machine (Operation 1214). Where it is determined that the user has provided login credentials via the second client machine, the real-time communication application(s) 132 may determine whether there is a session overlap between the first client machine and the second client machine, such as by referencing the user/machine data store 514 (Operation 1216). Should there be a session overlap between the first client machine and the second client machine, the real-time communication application(s) 132 may cause the display of a prompt (Operation 1218) inquiring whether the user desires to link the first client machine and the second client machine (Operation 1220). Where the user answers at Block 1220 in the affirmative, the real-time communication application(s) 132 may cause the linking of the first and second client machines based on one or more factors, such as network availability or quality (Operation 1222). Where the user answers at Block 1220 in the negative, the method illustrated in logic flow 1202 may end.

Alternatively, the user may initiate the linking of the first client machine and the second client machine (Operation 1224). Where a link request is received, the real-time communication application(s) 132 may cause the display of one or more linking identifiers on the first client machine and/or the second client machine (Operation 1226). Where a link request is not received, the operation of Block 1224 may be repeated. The displayed linking identifier(s) may be the same linking identifier or different linking identifiers (Operation 1228). The user may then be prompted (Operation 1228) to confirm that the correct linking identifier(s) are displayed on the first client machine and/or the second client machine. Where the user answers in the affirmative, the real-time communication application(s) 132 may then link the first client machine and the second client machine (Operation 1222). In the event the user cannot confirm that the correct linking identifier(s) are displayed, the primary machine and/or secondary machine may display a prompt with a new or alternative linking identifier.

In this manner, the disclosed systems and methods provide a mechanism by which a user can efficiently browse an electronic marketplace and maintain a running record of items that the user may have found desirable. Furthermore, the disclosed systems and methods leverage a number of various technologies including database technologies, real-time communications, authentication protocols, and other such networking technologies. Accordingly, the disclosed systems and methods involve a technical approach to address the shortcomings of browsing through items and/or services sold through an electronic marketplace, particularly where the machine being used to browse such items and/or services has a limited display.

Certain embodiments have been described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled.

A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments. It is contemplated that any features of any embodiments disclosed herein can be combined with any other features of any other embodiments disclosed herein. Accordingly, these any such hybrid embodiments are within the scope of the present disclosure.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   receiving, from a first machine, first authentication credentials including a user identifier used to authenticate a user, the first authentication credentials being provided during a first session of use of a website through the first machine;
   determining, by one or more processors, whether second authentication credentials received from a second machine match the first authentication credentials, wherein the second machine is different from the first machine, and the second authentication credentials are provided during a second session of use of the website through the second machine;
   causing, by the one or more processors, the first machine to display a prompt for a linking instruction, the prompt being displayed in response to determining that the second authentication credentials match the first authentication credentials;
   sending, by the one or more processors and based on a response to the prompt, a linking instruction to the second machine to link a display of second content of the website on the second machine to a display of first content of the website by the first machine;
   causing, by the one or more processors, the first machine to display the first content;
   receiving, by the one or more processors, a selection of a first portion of the first content displayed on the first machine, the first portion of the first content corresponding to a first item listing for a first item;
   causing, by the one or more processors, the second machine to display the second content comprising a comparison table based on the selection, the comparison table comprising a plurality of item feature categories, the comparison table listing a first item attribute for the first item in a first item feature category of the plurality of item feature categories and a second item attribute for a second item in the first item feature category, wherein the second item differs from the first item; and
   causing the first machine to display an indicator associated with the first item listing, wherein the indicator comprises an indication that one or more item features associated with the first item listing is displayed in the comparison table at the second machine.

2. The computer-implemented method of claim 1, further comprising:
   causing a change in the displaying of the first content displayed by the first machine based on an input received by the second machine.

3. The computer-implemented method of claim 1, further comprising:
   causing the first machine to send the second content to the second machine based on a determination that the first machine and the second machine are in communication via a local area network and in response to a request for the second content from the first machine.

4. The computer-implemented method of claim 1, further comprising:
   determining whether the first machine and the second machine are in communication via a local area network; and
   based on determining that the first machine and the second machine are in communication via the local area network:
   receiving a request for a content identifier for the second content; and
   sending the content identifier to the second machine for displaying the second content.

5. The computer-implemented method of claim 1, further comprising:
   sending an update notification that the first machine has received the selection of the first portion of the first content of the website, wherein the update notification causes the second content to be sent to the second machine.

6. The computer-implemented method of claim 5, wherein the first machine communicates with the website using a first communication channel and the second machine communicates with the website using a second communication channel, wherein; the first communication channel and the second communication channel are different communication channels.

7. The computer-implemented method of claim 1, wherein the first content includes information about a product or service offered by the website and the second content includes a user-configurable portion of the first content.

8. A system comprising:
   a non-transitory computer-readable medium storing computer-executable instructions; and
   one or more processors in communication with the non-transitory computer readable medium that, when the computer-executable instructions are executed by the one or more processors, the one or more processors are configured to:
   receive, from a first machine, first authentication credentials including a user identifier user to authenticate a user, the first authentication credentials being provided during a first session of use of a website through the first machine;
   determine whether second authentication credentials received from a second machine match the first authentication credentials, wherein the second machine is different from the first machine, and the second authentication credentials are provided during a second session of use of the website through the second machine;
   cause the first machine to display a prompt for a linking instruction, the prompt being displayed in response to determining that the second authentication credentials match the first authentication credentials;
   send, based on a response to the prompt, a linking instruction to the second machine to link a display of second content of the website on the second machine to a display of first content of the website by the first machine;

cause the first machine to display first content;
receive a selection of a first portion of the first content displayed on the first machine, the first portion of the first content corresponding to a first item listing for a first item;
cause the second machine to display the second content comprising a comparison table based on the selection, the comparison table comprising a plurality of item feature categories, the comparison table listing a first item attribute for the first item in a first item feature category of the plurality of item feature categories and a second item attribute for a second item in the first item feature category, wherein the second item differs from the first item; and
cause the first machine to display an indicator associated with the first item listing, wherein the indicator comprises an indication that one or more item features associated with the first item listing is displayed in the comparison table at the second machine.

9. The system of claim 8, wherein the one or more processors are further configured to:
cause a change in the first content displayed by the first machine based on an input received by the second machine.

10. The system of claim 8, wherein the one or more processors are further configured to:
cause the first machine to send the second content to the second machine based on a determination that the first machine and the second machine are in communication via a local area network and in response to a request for the second content from the first machine.

11. The system of claim 8, wherein the one or more processors are further configured to:
determine whether the first machine and the second machine are in communication via a local area network; and
based on determining that the first machine and the second machine are in communication via the local area network:
receive a request for a content identifier for the second content; and
send the content identifier to the second machine for displaying the second content.

12. The system of claim 8, wherein the one or more processors are further configured to:
send an update notification that the first machine has received the selection of the first portion of the first content of the website, wherein the update notification causes the second content to be sent to the second machine.

13. The system of claim 8, wherein the first machine communicates with the website using a first communication channel and the second machine communicates with the website using a second communication channel, wherein the first communication channel and the second communication channel are different communication channels.

14. The system of claim 8, wherein the first content includes information about a product or service offered by the website and the second content includes a user-configurable portion of the first content.

15. A non-transitory, computer-readable medium storing computer executable instructions that, when executed by one or more processors, cause the one or more processors to perform operations comprising:
receiving, from a first machine, first authentication credentials including a user identifier used to authenticate a user, the first authentication credentials being provided during a first session of use of a website through the first machine;
determining whether second authentication credentials received from a second machine match the first authentication credentials, wherein the second machine is different from the first machine, and the second authentication credentials are provided during a second session of use of the website through the second machine;
causing the first machine to display a prompt for a linking instruction, the prompt being displayed in response to determining that the second authentication credentials match the first authentication credentials;
sending, based on a response to the prompt, a linking instruction to the second machine to link a display of second content of the website on the second machine to a display of first content of the website by the first machine;
causing the first machine to display the first content;
receiving a selection of a first portion of the first content displayed on the first machine, the first portion of the first content corresponding to a first item listing for a first item;
causing the second machine to display the second content comprising a comparison table based on the selection, the comparison table comprising a plurality of item feature categories, the comparison table listing a first item attribute for the first item in a first item feature category of the plurality of item feature categories and a second item attribute for a second item in the first item feature category, wherein the second item differs from the first item; and
causing the first machine to display an indicator associated with the first item listing, wherein the indicator comprises an indication that one or more item features associated with the first item listing is displayed in the comparison table at the second machine.

16. The non-transitory, computer-readable medium of claim 15, the operations further comprising:
causing a change in the first content displayed by the first machine based on an input received by the second machine.

17. The non-transitory, computer-readable medium of claim 15, the operations further comprising:
determining whether the first machine and the second machine are in communication via a local area network; and
based on determining that the first machine and the second machine are in communication via the local area network:
receiving a request for a content identifier for the second content; and
sending the content identifier to the second machine for displaying the second content.

18. The computer-implemented method of claim 1, wherein the indicator comprises an icon, text, sound, or an audiovisual indicator.

19. The computer-implemented method of claim 1, further comprising:
receiving, by the one or more processors, a selection of a second portion of the first content displayed on the first machine, the second portion of the first content being a second item listing; and
causing, by the one or more processors, the second machine to display the comparison table based on the selection of the second item listing, the comparison table comprising a set of complementary information associated with the second item listing.

20. The computer-implemented method of claim 1, further comprising:
   causing, by the one or more processors, the second machine to remove the one or more item features associated with the first item listing from the comparison table; and
   causing, by the one or more processors, the first machine to remove the indicator associated the first item listing.

* * * * *